Patented Aug. 28, 1934

1,971,886

UNITED STATES PATENT OFFICE 1,971,886

PROCESS OF MAKING CAKE AND THE RESULTING PRODUCT

Verling M. Votaw and Herbert S. Coith, Wyoming, Ohio, assignors to The Procter & Gamble Company, Ivorydale, Ohio, a corporation of Ohio No Drawing. Application October 16, 1933, Serial No. 693,894

8 Claims. (Cl. 99—10)

Our invention relates to cakes containing more sugar than flour and to processes of making such cakes.

The object of our invention is to produe cakes of unusually high sugar content and of improved appearance and eating qualities, particularly with respect to a uniformly light and tender texture. Moistness, sweetness, and tenderness are highly prized in cakes and are obtained in increasing degree as the proportion of sugar to flour is increased and moisture is added. However, as these changes in the cake formula are made, the finished cake becomes smaller in volume, and heavier in texture, until a point is reached when the cake made with the usual commercial ingredients falls at the end of baking and is thus "sad" and a complete failure. Because of this tendency of the cake to fall, the amount of sugar in commercial cakes made with the usual commercial ingredients is on the average limited to less than the weight of flour present, notwithstanding the fact that more sugar and along with it more moisture would be advantageous from the standpoint of the best eating and keeping qualities of the cake.

By the practice of the present invention we overcome or in large measure counteract this tendency of the cake to fall as the proportion of sugar to flour and the accompanying moisture are increased in those cakes in which the essential ingredients are sugar, flour, fat, chemical leavening agent, egg white, and an aqueous liquid, preferably milk. We have found the invention to be of little value as applied to cakes made with whole eggs or egg yolks, but it is increasingly effective for making cakes of high sugar content and of good volume and texture as the proportion of egg white to egg yolk in such cakes is increased over that in whole egg (about 3 parts white to 2 parts yolk), and the invention is especially valuable for making cakes containing egg white without admixed egg yolk. Cakes of the type to which our invention relates, comprising the essential ingredients set forth above, will for convenience be hereinafter referred to as cakes of the white layer type, which should be understood to include not only those without egg yolk but also those made with a proportion of white to yolk greater than that of the natural whole egg.

We have found that the sugar carrying capacity of cakes of the white layer type is specifically increased by the action of lecithin incorporated in the cake batter. We have found that the proportion of sugar to flour in such cakes may be increased above 100% and even as high as 130% to 150%, without undue tendency of the cake to fall, if at some point in the mixing of the cake batter there is introduced a suitable quantity of lecithin. At the same time the proportion of milk or other liquid constituents in the cake may be increased, and these changes result in cakes of unusually fine texture and eating and keeping qualities. These results may be obtained with use of the triglyceride shortenings commonly available, which is a particular advantage of our invention.

These improvements in the cakes of the white layer type are brought about by the addition of quantities of lecithin amounting to from 0.1% to 0.3% of the weight of the total cake mixture. While the most effective concentrations of lecithin in the cake mix are inside the range given, larger amounts may be used with good results.

The lecithin to be added is most conveniently first dissolved in the fat to be used in the cake, and introduced into the cake mix in this way. However, it may be added alone or premixed with any of the other constituents of the cake mix with good results.

We find that to obtain the best results in the finished cake made according to this invention, it may be necessary to adjust the quantity of free fatty acid incorporated in the mix. Whether such free fatty acid is added separately or is merely a part of the shortening used, the total amount of free fatty acid is preferably between 0.2% and 4% by weight of the shortening. Any free fatty acid used in this way should be prepared so as to be of strictly edible grade. If equal quantities of free fatty acid and lecithin are used, the amount of lecithin necessary may be reduced somewhat.

Example I

Following is a formula and mixing method for a white layer cake of high sugar content:

| | Grams |
|---|---|
| Flour | 454 |
| Hydrogenated shortening | 247 |
| Lecithin | 5.4 |
| Sugar | 636 |
| Salt | 17.5 |
| Baking powder | 28.3 |
| Milk | 432 |
| Egg whites | 340 |

The fat, flour, and lecithin are put into the bowl of a mixing machine, for example a Hobart bench type mixer, and mixed for 3 minutes at low speed. The sugar, salt, baking powder, and 120 grams of the milk are then added and the mixing continued at low speed for 3 minutes. The remainder of the milk and egg whites are then added and mixing continued for a final period of 3 minutes. Baking is carried out at 375° F. in layer cake pans. The cake from this formula without the addition of lecithin is very likely to fall and in any case has about 19% less volume than when our invention is practiced.

*Example II*

Following is a formula for a devil's food cake of high sugar content:

| | Grams | |
|---|---|---|
| Flour | 453 | |
| Fat | 247 | Mixed |
| Lecithin | 6 | together |
| Sugar | 637 | |
| Cocoa | 92 | |
| Salt | 18 | |
| Soda | 7 | |
| Baking powder | 18 | |
| Milk | 587 | |
| Egg whites | 340 | |

Mixing is carried out in the same way as in Example I. In this case the lecithin is dissolved in the fat before making the cake.

*Example III*

Following is a formula for a high sugar white layer cake.

| | Grams |
|---|---|
| Flour | 453 |
| Fat | 226 |
| Lecithin | 2.3 |
| Free fatty acid | 2.3 |
| Sugar | 658 |
| Salt | 18 |
| Baking powder | 21 |
| Milk | 453 |
| Egg whites | 283 |

The mixing is carried out as in Example I. The cake has a volume about 25% greater when our invention is practiced. The cake without the lecithin and free fatty acid would be a failure.

In the above examples lecithin refers primarily to soybean lecithin, the kind generally available, but similar phosphatides from other sources have substantially the same specific effect on the sugar carrying capacity of cakes of the white layer type. The quantity of lecithin refers to the concentrated commercial product containing in the neighborhood of 75% actual phosphatide, not to the absolutely pure lecithin as such.

Having thus described the invention, what is claimed as new and desired to be secured by Letters Patent is:

1. The process of forming a cake batter which comprises mixing together flour, an amount of sugar greater than the amount of flour, fat, chemical leavening agent, an aqueous liquid, egg material containing a greater proportion of white to yolk than that occurring in the original eggs, and a small quantity of lecithin.

2. The process of stabilizing the volume of cake containing flour, sugar in amount greater than the amount of flour, plastic fat, baking powder, and aqueous liquid, and egg material consisting more than 60% of egg white, which comprises incorporating in the cake batter prior to baking an amount of lecithin between .1% and .3% of the total mix.

3. In the process of making cake containing as the essential ingredients flour, sugar in amount greater than the amount of flour, plastic fat, baking powder, an aqueous liquid, and egg material consisting more than 60% of egg white, the step which consists in adding to the mix lecithin along with edible free fatty acid.

4. The process of forming a cake batter which comprises mixing together flour, an amount of sugar greater than the amount of flour, fat, chemical leavening agent, milk, egg material consisting essentially of egg white, and a small quantity of lecithin.

5. The process of stabilizing the volume of cake containing flour, sugar in amount greater than the amount of flour, fat, baking powder, milk, and egg material consisting essentially of egg white, which comprises incorporating in the cake batter prior to baking an amount of lecithin between .1% and .3% of the total mix.

6. Cake containing flour, an amount of sugar greater than the amount of flour, fat, chemical leavening agent, an aqueous liquid, egg material containing a greater proportion of white to yolk than that occurring in the original eggs, and a small quantity of lecithin.

7. Cake containing flour, sugar in amount greater than the amount of flour, fat, baking powder, an aqueous liquid, egg material consisting more than 60% of egg white, and a quantity of lecithin between about .1% and about .3% of the weight of the total mix from which the cake is made.

8. Cake containing flour, sugar in amount greater than the amount of flour, plastic fat, baking powder, milk, egg material consisting essentially of egg white, and a small quantity of lecithin.

VERLING M. VOTAW.
HERBERT S. COITH.